(12) United States Patent
Huang et al.

(10) Patent No.: US 11,750,075 B2
(45) Date of Patent: Sep. 5, 2023

(54) VOICE COIL MOTOR

(71) Applicant: Lanto Electronic Limited, Kunshan (CN)

(72) Inventors: Wen-Yen Huang, Kunshan (CN); Meng-Ting Lin, Kunshan (CN); Fu-Yuan Wu, Kunshan (CN); Shang-Yu Hsu, Kunshan (CN); Bing-Bing Ma, Kunshan (CN); Jie Du, Kunshan (CN)

(73) Assignee: Lanto Electronic Limited, Kunshan (CN)

( * ) Notice: Subject to any disclaimer, the term of this patent is extended or adjusted under 35 U.S.C. 154(b) by 271 days.

(21) Appl. No.: 17/327,141

(22) Filed: May 21, 2021

(65) Prior Publication Data

US 2021/0281158 A1 Sep. 9, 2021

(30) Foreign Application Priority Data

Dec. 18, 2020 (CN) .......................... 202023074684.X

(51) Int. Cl.
| | | |
|---|---|---|
| *G02B 7/02* | (2021.01) | |
| *H02K 41/035* | (2006.01) | |
| *G03B 5/04* | (2021.01) | |
| *G02B 7/04* | (2021.01) | |

(52) U.S. Cl.
CPC .......... *H02K 41/0356* (2013.01); *G02B 7/04* (2013.01); *G03B 5/04* (2013.01); *G03B 2205/0069* (2013.01)

(58) Field of Classification Search
CPC ........ H02K 41/0356; G02B 7/04; G02B 7/02; G03B 5/04; G03B 5/00; G03B 2205/0069; G03B 2205/0053

USPC ......................................................... 359/824
See application file for complete search history.

(56) References Cited

U.S. PATENT DOCUMENTS

| | | | | |
|---|---|---|---|---|
| 2008/0037143 A1* | 2/2008 | Yoon | ........................ | G02B 7/08 |
| | | | | 359/824 |
| 2019/0170967 A1* | 6/2019 | Jung | ...................... | H04N 23/57 |
| 2021/0018717 A1* | 1/2021 | Ichihashi | ............... | H04N 23/54 |
| 2021/0199917 A1* | 7/2021 | Jung | ...................... | G03B 13/36 |
| 2022/0350224 A1* | 11/2022 | Lee | ........................ | G03B 13/36 |

FOREIGN PATENT DOCUMENTS

| | | |
|---|---|---|
| CN | 206020785 U | 3/2017 |
| CN | 207114854 U | 3/2018 |

* cited by examiner

*Primary Examiner* — William R Alexander
(74) *Attorney, Agent, or Firm* — Birch, Stewart, Kolasch & Birch, LLP

(57) ABSTRACT

A voice coil motor includes a base, a lens housing, a voice coil, a magnet, a first elastic sheet, and a yoke member. The lens housing has a first margin wall, and a first protrusion and a second protrusion extend from the first margin wall. The height of the second protrusion is lower than the height of the first protrusion. The yoke member has a first wall, a connection wall, a second wall, and a side wall. The first wall, the connection wall, and the second wall together form a stepped structure. The first wall is disposed on the first protrusion, and the second wall is disposed on the second protrusion. The lens housing has a deflectable angle relative to a horizontal reference line. When the lens housing deflects to a maximum value of the deflectable angle, the second protrusion abuts against the second wall.

13 Claims, 5 Drawing Sheets

VOICE COIL MOTOR

CROSS-REFERENCE TO RELATED APPLICATION

This non-provisional application claims priority under 35 U.S.C. § 119(a) to Patent Application No. 202023074684.X filed in China, P.R.C. on Dec. 18, 2020, the entire contents of which are hereby incorporated by reference.

BACKGROUND

Technical Field

The present disclosure relates to a field of optical lenses, and more specifically relates to a voice coil motor.

Related Art

Almost all current smart mobile devices are equipped with lens modules. Miniaturizing the lens module and driving the lens of the lens module to elevate or to zoom in/out are mainly achieved through a voice coil motor.

A voice coil motor generally includes a lens housing, a voice coil, a magnet, and a yoke member. Through receiving electrical signals by the voice coil, the voice coil interacts with the magnet, thereby driving the lens to move. However, when the lens is moving, such as when the lens is moving forward/backward in the Z direction, the lens may still be subjected to an external force or a component force caused by its own weight in other directions different from the Z direction. This results in deflections of the lens and the lens housing, for example, the lens and the lens housing may move towards the X direction or the Y direction.

When the lens housing is excessively deflected, the entire lens module may be stuck and cannot be moved upward/downward. Though a slight deflection will not affect the elevating function of the lens module, in a long-term perspective, the friction between the lens housing and the yoke member due to the deflection of the lens housing will produce abrasion debris, which can easily cause clogging and pollution problems, and even affect the operation of the lens module or the quality of image-capturing.

SUMMARY

The technical problem(s) that the present disclosure attempts to solve is providing a voice coil motor capable of limiting the elevation of the lens (or the lens housing) or limiting the deflectable angle when it is subjected to an external force. Moreover, with the elastic sheet, the lens housing can be quickly moved resiliently to its original position when a small angle deflection occurs, thereby ensuring the service life of the overall lens module.

In order to achieve the aforementioned objective(s), a general embodiment of the present disclosure provides a voice coil motor. The voice coil motor includes a base having a placement portion, a lens housing, a voice coil, a magnet, a first elastic sheet, and a yoke member. The lens housing is assembled on the base, and the lens housing has a first margin wall. A first protrusion and a second protrusion extend from the first margin wall. The second protrusion is at an outer side of the first protrusion, and a height of the second protrusion is lower than a height of the first protrusion. The voice coil assembled on an outer edge of the lens housing. The magnet is disposed on the placement portion of the base and located at one side of the lens housing, and the magnet is spaced apart from the voice coil. The first elastic sheet having a hollowed slot, and the first protrusion penetrates the hollowed slot so that the first elastic sheet is disposed on a portion of the first margin wall. The yoke member has a first wall, a connection wall, a second wall, and a side wall. The connection wall extends out from one side of the first wall in a direction perpendicular to the first wall. The second wall extends outward form one side of the connection wall, and the second wall is parallel to the first wall. The side wall extends outward form one side of the second wall, and the side wall is parallel to the connection wall. The side wall is connected to the base so that the yoke member surrounds the lens housing, the first elastic sheet, the voice coil, and the magnet. The first wall is above the first protrusion, and the second wall is above the second protrusion. The lens housing has a deflectable angle relative to a horizontal reference line, and the deflectable angle is an included angle between the lens housing and the horizontal reference line. When the lens housing deflects to a maximum value of the deflectable angle, the second protrusion abuts against the second wall, by which the lens housing and the yoke member interfere with each other.

In some embodiments of the voice coil motor, the deflectable angle is not greater than 2.9 degrees.

In some embodiments of the voice coil motor, a distance between the first protrusion and the first wall is 0.15 mm to 0.17 mm, and a distance between the second protrusion and the second wall is 0.15 mm to 0.17 mm.

In some embodiments of the voice coil motor, the lens housing further includes a second margin wall opposite to the first margin wall. The voice coil further includes a second elastic sheet, and the second elastic sheet includes an assembling section, a connection section, and an extension section. The assembling section is disposed along the second margin wall, and the assembling section is positioned on the second margin wall. The connection section is connected between the assembling section and the extension section, and wherein the extension section extends from the connection section, and the extension section is attached to one side of the magnet.

In some embodiments of the voice coil motor, a vertical projection of the extension section overlaps a portion of a vertical projection of the magnet.

In some embodiments of the voice coil motor, the second margin wall has a protruding edge, and the assembling section is disposed along the protruding edge and positioned on the protruding edge.

In some embodiments of the voice coil motor, the second elastic sheet includes two elastic components. The two elastic components are separated from each other and are symmetrically arranged on the second margin wall around a central axis of the lens housing.

In some embodiments of the voice coil motor, the second margin wall further includes a bump protruding from the protruding edge, and the two elastic components are respectively positioned at two sides of the bump.

In some embodiments of the voice coil motor, the first margin wall further includes an inner flange. A groove is disposed between the inner flange and the first protrusion, and an extension arm of the first elastic sheet is disposed in the groove.

In some embodiments of the voice coil motor, two ends of the extension arm are connected to two limiting sections, respectively. A width of the limiting section is greater than a width of the extending arm, and the first protrusion is disposed between the two limiting sections.

In some embodiments of the voice coil motor, the first elastic sheet includes an abutting section and a clamp section. The clamp section is disposed on the first margin wall, and the abutting section is connected to the clamp section and one of the two limiting sections. The abutting section is disposed on the magnet, and a vertical projection of the abutting section overlaps a portion of a vertical projection of the magnet.

In some embodiments of the voice coil motor, the hollowed slot is located between the clamp section and the extension arm.

In some embodiments of the voice coil motor, a width of the abutting section is greater than a width of the clamp section, and a width of the extension arm is less than a width of the clamp section.

The beneficial effect of the voice coil motor in one or some embodiments is described as below. Since the lens housing has the first protrusion and the second protrusion, and the yoke member has the corresponding first wall and the second wall, when the lens housing deflects to the maximum value of the deflectable angle, the second protrusion abuts against the second wall, so that the lens housing and the yoke member interfere with each other. Thus, the effect limits the deflectable angle of the lens housing during the lens is elevated or subjected to an external force. Moreover, with the first elastic sheet and the second elastic sheet, the lens housing can be quickly moved resiliently to its original position when a small-angle deflection occurs, thereby ensuring the service life of the overall lens module.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
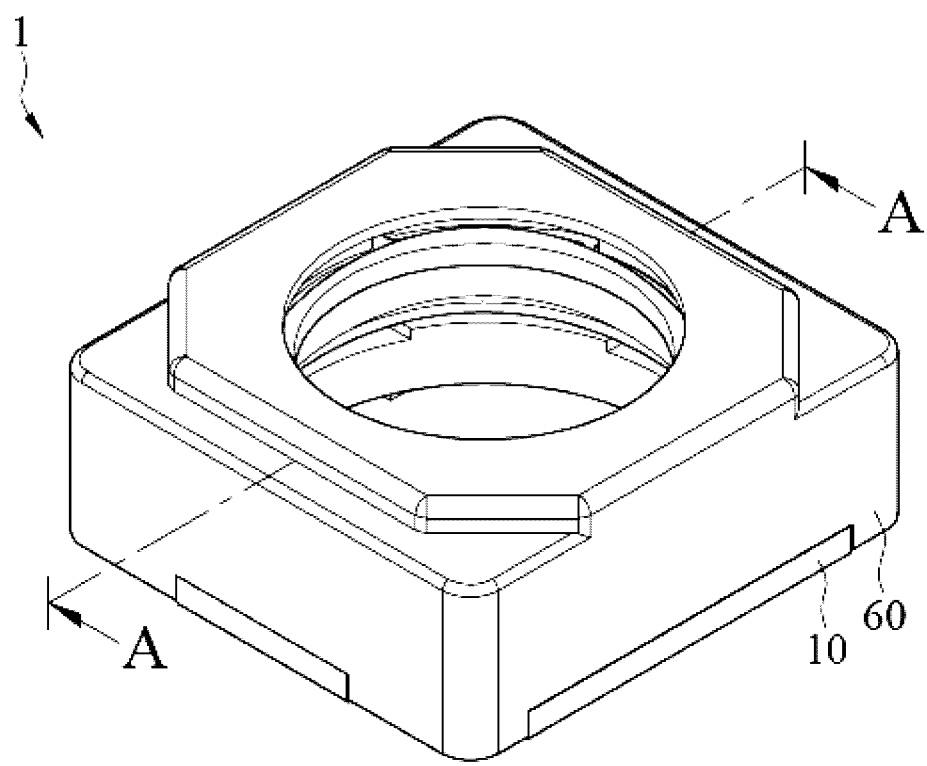
FIG. 1 illustrates a schematic perspective view of a voice coil motor according to an exemplary embodiment of the present disclosure.

Hereinafter, the present disclosure will be described more specifically with reference to the following embodiments. The accompany drawings in the present application are to be regarded as illustrative in nature for explaining the detail of the present disclosure and not restrictive. The size of and ratios between elements shown in the drawings may be arbitrarily shown for better understanding, and the real ratio can be adjusted according to design requirements. It should be understood that when an element is referred to as being "on", "connected to", or "coupled to" another element, it may be directly on, connected to, or coupled to the other element or one or more intervening elements may also be present. On the contrary, when one element is referred to as being "directly on", "directly connected to", or "directly coupled to" another element, it can be clearly understood that there are no intervening elements between the two elements.

In addition, it will be understood that, although the terms "first", "second", "third", etc. may be used herein to describe various elements, components, regions, and/or sections, these terms are only used to distinguish these elements, components, regions, and/or sections, rather than are used to represent the definite order of these elements, components, regions, and/or sections. Moreover, spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. In other words, these terms only represents a relative position relationship between the described components, not an absolute position relationship between the described components.

Hereinafter, the principle of structures and the principle of operation of the present disclosure will be described more fully with reference to the accompanying drawings.

Figure 2:
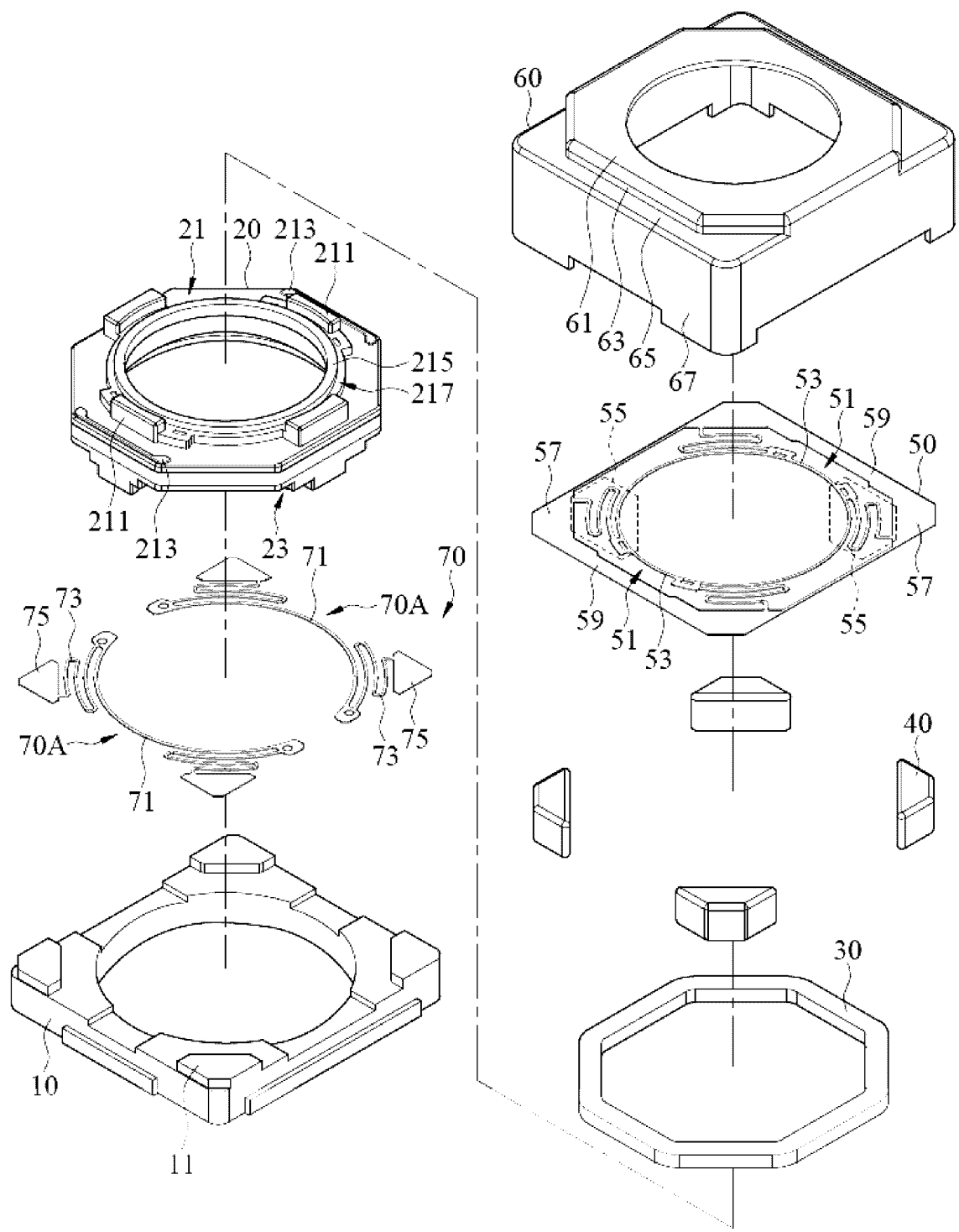
FIG. 2 illustrates a schematic exploded view of the voice coil motor according to the exemplary embodiment of the present disclosure.
Figure 3:
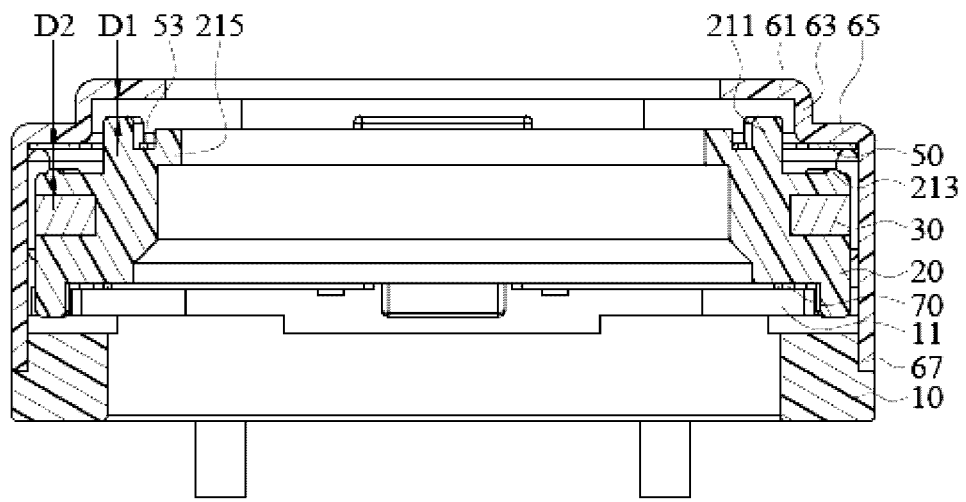
FIG. 3 illustrates a schematic cross-sectional view of the voice coil motor according to the exemplary embodiment of the present disclosure.
Figure 4:
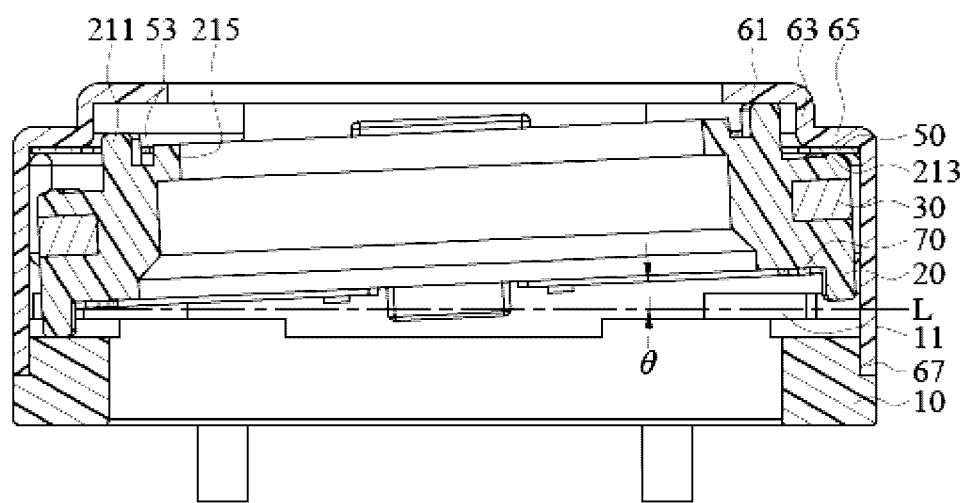
FIG. 4 illustrates a schematic cross-sectional view of the voice coil motor according to the exemplary embodiment where the lens housing is in a deflected state.

FIG. 1 illustrates a schematic perspective view of a voice coil motor 1 according to an exemplary embodiment of the present disclosure. FIG. 2 illustrates a schematic exploded view of the voice coil motor 1 according to the exemplary embodiment of the present disclosure. FIG. 3 illustrates a schematic cross-sectional view of the voice coil motor 1 according to the exemplary embodiment of the present disclosure. FIG. 4 illustrates a schematic cross-sectional view of the voice coil motor 1 according to the exemplary embodiment where the lens housing 20 is in a deflected state. The schematic cross-sectional view shown in FIG. 3 is taken along the line A-A in FIG. 1. As shown in FIG. 1 to FIG. 4, the voice coil motor 1 includes a base 10, a lens housing 20, a voice coil 30, a magnet 40, a first elastic sheet 50, and a yoke member 60. The base 10 includes a placement portion 11. The lens housing 20 is assembled on the base 10. The lens housing 20 has a first margin wall 21. A first protrusion 211 and a second protrusion 213 extend from the first margin wall 21. The second protrusion 213 is located at the outer side of the first protrusion 211. The height of the second protrusion 213 is lower than the height of the first protrusion 211. The voice coil 30 is assembled on the outer edge of the lens housing 20. The magnet 40 is disposed on the placement portion 11 of the base 10. The magnet 40 is located at one side of the lens housing (e.g. located at the outer side of the lens housing 20), and is spaced apart from the voice coil 30. The first elastic sheet 50 has a hollowed slot 51. The first protrusion 211 penetrates the hollowed slot 51 so that the first elastic sheet 50 is disposed on a portion of the first margin wall 21.

The yoke member 60 includes a first wall 61, a connection wall 63, a second wall 65, and a side wall 67. The connection wall 63 extends outward from one side of the first wall 61 in a direction perpendicular to the first wall 61. The second wall 65 extends out from one side of the connection wall 63, and the second wall 65 is parallel to the first wall 61. The side wall 67 extends out from one side of the second wall 65, and the side wall 67 is parallel to the connection wall 63. Thus, the first wall 61, the connection wall 63, the second wall 65, and the side wall 67 together form a stepped structure. The side wall 67 is connected to the base 10, so that the yoke member 60 surrounds the lens housing 20, the voice coil 30, the magnet 40, and the first elastic sheet 50. The first wall 61 is above the first protrusion 211, and the second wall 65 is above the second protrusion 213.

As shown in FIG. 3, the distance D1 between the first protrusion 211 and the first wall 61 may be 0.15 mm to 0.17 mm, preferably, in some embodiments, 0.158 mm to 0.164 mm. The distance D2 between the second protrusion 213 and the second wall 65 may be 0.15 mm to 0.17 mm, preferably, in some embodiments, 0.158 mm to 0.164 mm.

As shown in FIG. 4, the lens housing 20 has a deflectable angle θ relative to the horizontal reference line L. The deflectable angle θ is the included angle between the lens housing 20 and the horizontal reference line L. When the lens housing 20 deflects from the horizontal reference line L to the maximum value of the deflectable angle θ, the second protrusion 213 abuts against the first elastic sheet 50, and the second protrusion 213 further abuts against the second wall 65 through the first elastic sheet 50. Consequently, the lens housing 20 and the yoke member 60 interfere with each other. With the configuration of the second protrusions 213 and the second wall 65, the deflectable angle θ of the lens housing 20 can be limited. Generally, the deflection angle θ may be 1 degree to 3.2 degrees, more preferably, in some embodiments, not greater than 2.9 degrees.

For the convenience of presentation, the stepped structure on the upper portion of the yoke member 60 and the first elastic sheet 50 in FIG. 1 to FIG. 4 are presented in a bilaterally symmetrical manner. However, it can be understood that, since the yoke member 60 can be formed by stamping, the stepped structure may be formed on only one side of the upper portion of the yoke member 60 or several sides of the upper portion of the yoke member 60. In other words, the yoke member 60 may be symmetrical or unsymmetrical. The term "deflection" mentioned above refers to the state that the lens housing 20 is deflected toward the yoke member 60.

Figure 5:
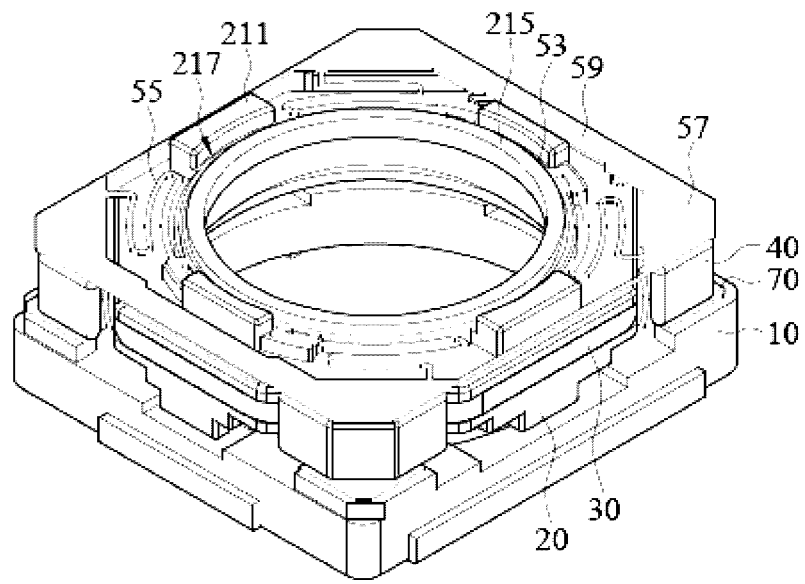
FIG. 5 illustrates a schematic perspective view of the lens housing and the first elastic sheet according to the exemplary embodiment of the present disclosure.
Figure 6:
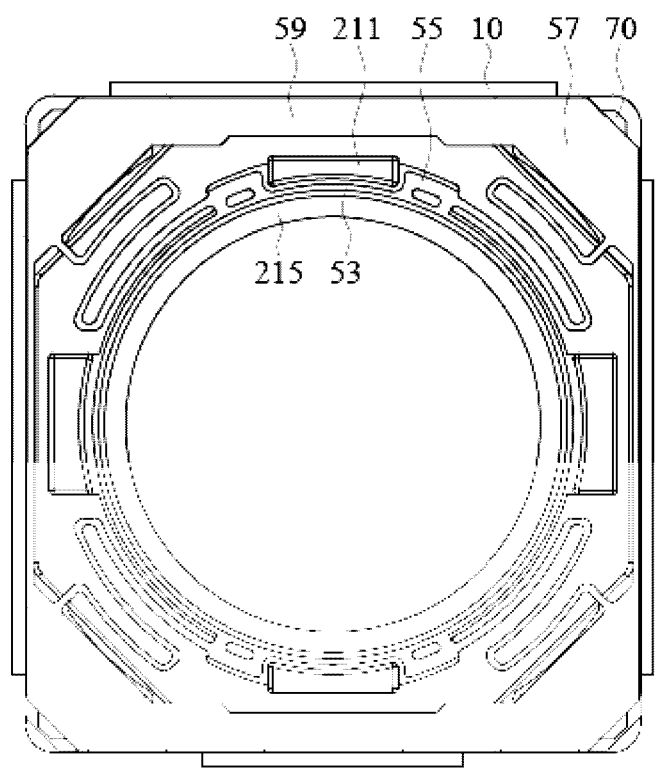
FIG. 6 illustrates a schematic partial top view of the voice coil motor according to the exemplary embodiment of the present disclosure.

FIG. 5 illustrates a schematic perspective view of the lens housing 20 and the first elastic sheet 50 according to the exemplary embodiment of the present disclosure. FIG. 6 illustrates a schematic partial top view of the voice coil motor 1 according to the exemplary embodiment of the present disclosure. As shown in FIG. 5 and FIG. 6, also referring to FIG. 2 at the same time, the first margin wall 21 further includes an inner flange 215. A groove 217 is disposed between the inner flange 215 and the first protrusion 211. An extension arm 53 of the first elastic sheet 50 is disposed in the groove 217. Specifically, in this embodiment, two ends of the extension arm 53 are respectively connected to the limiting section 55. The width of the limiting section 55 is greater than the width of the extending arm 53, and the first protrusion 211 is disposed between the two limiting sections 55. Therefore, through the interference among the first protrusion 211, the groove 217, the extension arm 53, and the limiting section 55, the position of the first elastic sheet 50 can be limited, thereby preventing the first elastic sheet 50 from detaching off the lens housing 20.

Moreover, please further refer to FIG. 2 at the same time. The first elastic sheet 50 includes an abutting section 57 and a clamp section 59. The clamp section 59 is disposed on the first margin wall 21. The abutting section 57 connects with the clamp section 59 and the limiting section 55. The abutting section 57 is disposed on the magnet 40, and the vertical projection of the abutting section 57 overlaps a portion of the vertical projection of the magnet 40. More specifically, in this embodiment, the hollowed slot 51 is located between the clamp section 59 and the extension arm 53. Furthermore, the width of the abutting section 57 is greater than the width of the clamp section 59, and the width of the extension arm 53 is less than the width of the clamp section 59. In other words, making the clamp section 59 and the limiting section 55 have greater widths facilitates in preventing the first elastic sheet 50 from breaking when the voice coil motor 1 is subjected to an excessive external force, thereby maintaining the elasticity of the first elastic sheet 50 and providing the lens housing 20 with elastic force to move resiliently to its original position when lens housing 20 deflects.

Figure 7:
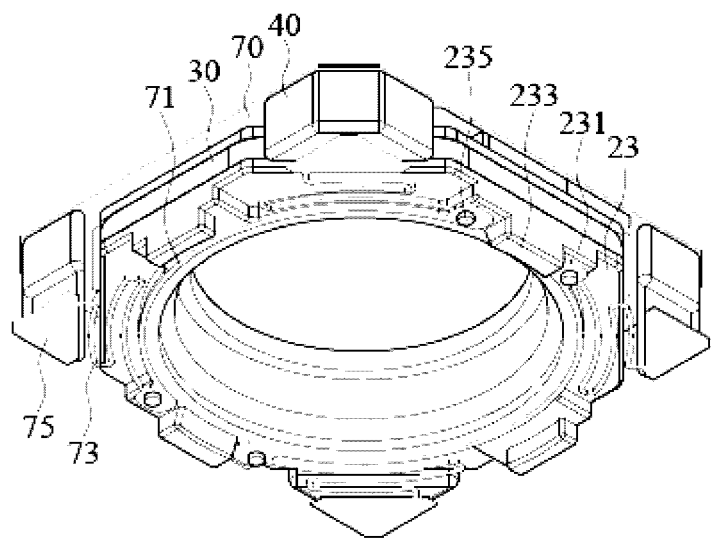
FIG. 7 illustrates a schematic perspective view of the lens housing and the second elastic sheet according to the exemplary embodiment of the present disclosure.
Figure 8:
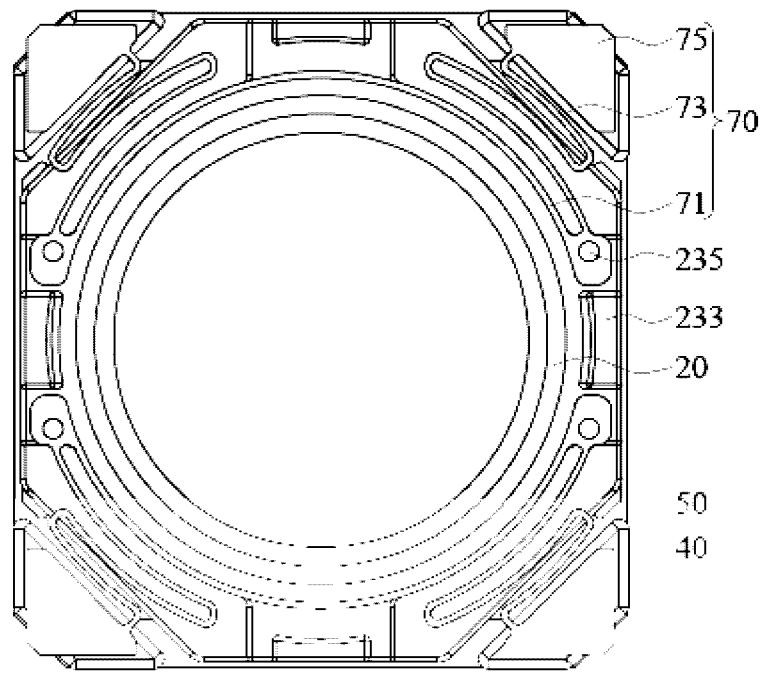
FIG. 8 illustrates a schematic partial bottom view of the voice coil motor according to the exemplary embodiment of the present disclosure.

FIG. 7 illustrates a schematic perspective view of the lens housing 20 and a second elastic sheet 70 according to the exemplary embodiment of the present disclosure. FIG. 8 illustrates a schematic partial bottom view of the voice coil motor 1 according to the exemplary embodiment of the present disclosure. As shown in FIG. 7 and FIG. 8, the lens housing 20 further includes a second margin wall 23 opposite to the first margin wall 21. Please refer to FIG. 2. The first margin wall 21 and the second margin wall 23 are respectively located at the upper side and the lower side of the lens housing 20. The voice coil motor 1 may further include a second elastic sheet 70. The second elastic sheet 70 includes an assembling section 71, a connection section 73, and an extension section 75. The assembling section 71 is disposed along the second margin wall 23, and the assembling section 71 is positioned on the second margin wall 23. The connection section 73 is connected between the assembling section 71 and the extension section 75.

The extension section 75 extends from the connection section 73, and the extension section 75 is attached to one side of the magnet 40. In some embodiments, the vertical projection of the extension section 75 overlaps a portion of the vertical projection of the magnet 40.

In some embodiments, the second margin wall 23 has a protruding edge 231. The assembling section 71 is disposed along the protruding edge 231 and is positioned on the protruding edge 231. More specifically, in some embodiments, the second elastic sheet 70 includes two elastic components 70A. The two elastic components 70A are separated from each other and are symmetrically arranged on the second margin wall 23 around the central axis of the lens housing 20. Moreover, the second margin wall 23 further includes a bump 233. The bump 233 protrudes from the protruding edge 231. The two elastic components 70A are respectively positioned at two sides of the bump 233. Openings may be provided on both sides of the bump 233, and the two elastic components 70A may be fixedly positioned in the openings by the fixing members 235. However, this arrangement is only provided as an example, not a limitation. For example, each of the two elastic components 70A may also have a tenon to be directly inserted into the corresponding opening for fixing. In some other embodiments, the fixing member 235 may also be a protruding fixing pin, which can be directly sleeved in the fixing hole of the assembling section 71. The second elastic sheet 70 disposed on the other side of the lens housing 20 opposite to the first elastic sheet 50 can also provide the elastic force for the lens housing 20 to move resiliently to its original position when the lens housing 20 deflects.

To sum up, according to one or some embodiments of the instant disclosure, since the lens housing 20 has the first protrusion 211 and the second protrusion 213, and the yoke member 60 has the corresponding first wall 61 and the second wall 65, when the lens housing 20 deflects to the maximum value of the deflectable angle θ, the second protrusion 213 abuts against the second wall 65 so that the lens housing 20 and the yoke member 60 interfere with each other. Thus, the effect that limiting the elevation of the lens or the deflectable angle θ of the lens when it is subjected to an external force can be achieved. Moreover, according to one or some embodiments of the present disclosure, with the first elastic sheet 50 and the second elastic sheet 70, the lens housing 20 can be quickly moved resiliently to its original position when a small-angle deflection occurs, thereby ensuring the service life of the overall lens module.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A voice coil motor, comprising:
    a base having a placement portion;
    a lens housing assembled on the base, wherein the lens housing has a first margin wall, and a first protrusion and a second protrusion extend from the first margin wall, wherein the second protrusion is positioned at outer side of the first protrusion, and a height of the second protrusion is lower than a height of the first protrusion;
    a voice coil assembled on an outer edge of the lens housing;
    a magnet disposed on the placement portion of the base and located at one side of the lens housing, wherein the magnet is spaced apart from the voice coil;
    a first elastic sheet having a hollowed slot, wherein the first protrusion penetrates the hollowed slot so that the first elastic sheet is disposed on a portion of the first margin wall; and
    a yoke member having a first wall, a connection wall, a second wall, and a side wall, wherein the connection wall extends outward from one side of the first wall in a direction perpendicular to the first wall, wherein the second wall extends outward form one side of the connection wall, and the second wall is parallel to the first wall, wherein the side wall extends outward from one side of the second wall, and the side wall is parallel to the connection wall, wherein the side wall is connected to the base so that the yoke member surrounds the lens housing, the first elastic sheet, the voice coil, and the magnet, and wherein the first wall is above the first protrusion, and the second wall is above the second protrusion; and
    wherein the lens housing has a deflectable angle relative to a horizontal reference line, and the deflectable angle is an included angle between the lens housing and the horizontal reference line, and wherein when the lens housing deflects to a maximum value of the deflectable angle, the second protrusion abuts against the second wall, so that the lens housing and the yoke member interfere with each other.

2. The voice coil motor according to claim 1, wherein the deflectable angle is not greater than 2.9 degrees.

3. The voice coil motor according to claim 1, wherein a distance between the first protrusion and the first wall is 0.15 mm to 0.17 mm, and a distance between the second protrusion and the second wall is 0.15 mm to 0.17 mm.

4. The voice coil motor according to claim 1, wherein the lens housing further comprises a second margin wall opposite to the first margin wall, wherein the voice coil further comprises a second elastic sheet, and the second elastic sheet comprises an assembling section, a connection section, and an extension section, wherein the assembling section is disposed along the second margin wall, and the assembling section is positioned on the second margin wall, wherein the connection section is connected between the assembling section and the extension section, and wherein the extension section extends from the connection section, and the extension section is attached to one side of the magnet.

5. The voice coil motor according to claim 4, wherein a vertical projection of the extension section overlaps a portion of a vertical projection of the magnet.

6. The voice coil motor according to claim 4, wherein the second margin wall has a protruding edge, and the assembly section is disposed along the protruding edge and positioned on the protruding edge.

7. The voice coil motor according to claim 6, wherein the second elastic sheet comprises two elastic components, wherein the two elastic components are separated from each other and are symmetrically arranged on the second margin wall around a central axis of the lens housing.

8. The voice coil motor according to claim 7, wherein the second margin wall further comprises a bump protruding from the protruding edge, wherein the two elastic components are respectively positioned at two sides of the bump.

9. The voice coil motor according to claim 1, wherein the first margin wall further comprises an inner flange, and a groove is between the inner flange and the first protrusion, and wherein an extension arm of the first elastic sheet is disposed in the groove.

10. The voice coil motor according to claim 9, wherein two ends of the extension arm are connected to two limiting sections, respectively, wherein a width of the limiting section is greater than a width of the extending arm, and the first protrusion is disposed between the two limiting sections.

11. The voice coil motor according to claim 10, wherein the first elastic sheet comprises an abutting section and a clamp section, wherein the clamp section is disposed on the first margin wall, and the abutting section is connected to the clamp section and one of the two limiting sections, and wherein the abutting section is on the magnet, and a vertical projection of the abutting section overlaps a portion of a vertical projection of the magnet.

12. The voice coil motor according to claim 11, wherein the hollowed slot is located between the clamp section and the extension arm.

13. The voice coil motor according to claim 11, wherein a width of the abutting section is greater than a width of the clamp section, and a width of the extension arm is less than a width of the clamp section.

* * * * *